(12) United States Patent
Maximovsky et al.

(10) Patent No.: US 7,767,271 B2
(45) Date of Patent: Aug. 3, 2010

(54) METHOD FOR PRODUCING A METALLIZED IMAGE ON A SHEET MATERIAL AND DEVICE FOR CARRYING OUT SAID METHOD

(76) Inventors: Sergei Nikolaevich Maximovsky, ul.Skakovaya 34-4-235, Moscow 125040 (RU); Grigory Avramovich Radutsky, ul. Pervomaiskaya, 66-45, Moscow 105043 (RU)

( * ) Notice: Subject to any disclaimer, the term of this patent is extended or adjusted under 35 U.S.C. 154(b) by 310 days.

(21) Appl. No.: 10/587,922

(22) PCT Filed: Jul. 9, 2004

(86) PCT No.: PCT/RU2004/000264

§ 371 (c)(1),
(2), (4) Date: Jan. 11, 2007

(87) PCT Pub. No.: WO2005/072987

PCT Pub. Date: Aug. 11, 2005

(65) Prior Publication Data

US 2007/0224553 A1    Sep. 27, 2007

(30) Foreign Application Priority Data

Feb. 2, 2004    (RU) ............................... 2004102722

(51) Int. Cl.
*B05D 3/00* (2006.01)
(52) U.S. Cl. ..................... 427/554; 427/518; 427/552; 427/561; 427/564; 427/586; 427/587; 118/610; 118/641; 118/216; 118/256; 118/263; 156/345.11; 156/345.17
(58) Field of Classification Search .................. 427/554; 118/641; 156/345.11
See application file for complete search history.

(56) References Cited

U.S. PATENT DOCUMENTS 3,835,780 A * 9/1974 Gracia et al. .............. 430/275.1
4,511,595 A * 4/1985 Inoue ......................... 427/581

FOREIGN PATENT DOCUMENTS

| JP | 2001080210 A | 3/2001 |
|---|---|---|
| SU | 1831436 A3 | 7/1993 |
| WO | 01/38940 A2 | 5/2001 |

\* cited by examiner

*Primary Examiner*—Duy-Vu N. Deo
*Assistant Examiner*—Maki Angadi
(74) *Attorney, Agent, or Firm*—Fitch, Even, Tabin & Flannery

(57) ABSTRACT

A method for producing a metallized image on a sheet material includes impregnating the material with a metal salts-containing solution and exposing the specified material points to a pulse laser radiation. The interaction of the pulses with the solution within a laser spot irritates a photochemical reaction resulting in a metal ion reduction into the elementary state thereof by associating the required number of electrons and deposition of metallic film which is firmly fixed to the filler of the sheet material in the laser spot area on the material surface. In case of sufficient laser radiation power, a recess is formed on the sheet material surface, and the metallic film is deposited on the bottom of the recess. An apparatus for carrying out the method for producing a metallized image comprises means for impregnating the sheet material with the metal salts-containing solution and means provided with a laser pulse generator for fixing the metal to said sheet material, a unit for controlling the pulse intensity and a unit for focusing pulses to the specified points of the sheet material.

7 Claims, 1 Drawing Sheet

METHOD FOR PRODUCING A METALLIZED IMAGE ON A SHEET MATERIAL AND DEVICE FOR CARRYING OUT SAID METHOD

FIELD OF THE INVENTION

The present invention relates to printing means that allow the production of a metallized image on a sheet material. More particularly, the invention relates to means for forming an original image on a sheet material, said image being capable of protecting said material against counterfeit.

BACKGROUND OF THE INVENTION

Known is a method for producing a metallized image on a sheet material, consisting in producing an image by acting to the sheet material through a metal foil sheet with a mold preliminary made and heated up to a certain temperature (cf., the USSR Inventor's Certificate No 1,831,436 A3, IPC B41F 19/06, B42C 13/00).

Being exposed to pressure and temperature, projecting members of the mold provide engagement of foil areas with the sheet material. Upon removal of the spent foil sheet with voids corresponding to mold projections, a metallized image will remain on the sheet material.

This method practically prevailing in printing arts is unacceptable for protecting special production printed on a sheet material, and first of all because any skilled person can reproduce said method at minimum material costs.

Further, to apply personified images by this method, an own mold for each image is necessary which is impracticable.

A printing device realized according to said method comprises a press onto a table thereof a sheet material, a foil, and a mold to be heated are sequentially laid. Upon compression with holding of the sheet material, the mold is removed. The spent foil sheet with voids that correspond to projection of the mold is withdrawn, and the sheet material is taken off, wherein a metallized image covers respective areas of said sheet material.

This prior art device gives no chance to produce an image consisting of a plurality of metallized points each having a size from 20 μm to 80 mμ and being deepened into a body of the sheet material, because manufacture of a mold to comply with this requirement is practically impossible. But exactly this embodiment of the metallized image is able to protect special production printed on the sheet material. Further, this device cannot allow difference of each next metallized image from a previous one without replacement of the mold.

DISCLOSURE OF THE INVENTION

An object being the basis of the present invention is to provide such a method for producing a metallized image on a sheet material and such a device for carrying out said method that allow creation of an original image on the sheet material, said image being not reproducible by another method, safely protected against counterfeit and allowing creation of a personified image without preliminary manufacture of special molds.

Said object is accomplished by that, in a method for producing a metallized image on a sheet material, said method consisting in applying a metal onto the sheet material and exposing it at specified points to a means that provides their fixation at said points, in accordance with the invention, a solution containing a salt of the metal is applied onto the sheet material, the sheet material is impregnated with said solution, extraction of the metal from the solution is caused at the specified points of a surface of the sheet material, and an image is formed from a combination of said metallized points.

With such a method for producing a metallized image, it is not necessary to make a mold, and the creation of any image is possible.

It is advantageous when the extraction of the metal from the solution is caused by electromagnetic radiation pulses which are focused on the specified points of the sheet material surface.

With such a method for producing a metallized image, it is possible to create said image from the metallized points having a size depending upon a value of a spot of the focused electromagnetic radiation and with a speed equal to a duration of the pulse of said radiation.

It is advantageous when the electromagnetic radiation pulses reduce, in the solution, metal ions to the metal and deposit said metal at the specified points of the sheet material.

With such a method for producing a metallized image, a photochemical reaction takes place under action of an electromagnetic radiation pulse at each specified point of the sheet material in the solution impregnating it. As a result of this reaction, a metal ion is reduced into the elementary state thereof by associating the required number of electrons, while the metal is deposited as a film at each of said points.

It is advantageous when a duration and an energy of the electromagnetic radiation pulses are limited to values at which said radiation is unable to burn the sheet material through.

With such a method for producing a metallized image, a damage of the sheet material is excluded.

It is advantageous when recesses in the sheet material are formed under action of the electromagnetic radiation pulses, the metal from the solution is deposited at their bottoms, and an image is formed from a combination of metallized points deepened into the body of the sheet material.

With such a method for producing a metallized image, it is possible to produce metallized points at any distance from the surface of the sheet material within its thickness, which allows provision of reliable protection of the image against counterfeit.

It is advantageous when a solution in which salts of several metals are present is prepared, simultaneously all the metals present in the solution are deposited therefrom at each of the specified points of the sheet material, and either metal alloys or doped metals are formed at said points.

With such a method for producing a metallized image, yet more improvement in protective properties of the latter takes place.

It is advantageous when laser radiation pulses are used as the electromagnetic radiation pulses.

With such a method for producing a metallized image, it is possible to produce image points of any size, starting from a radiation wavelength value, for a negligible short time of the radiation pulse duration.

The object posed is also accomplished by that, in a device for applying a metallized image onto a sheet material, said device comprising a means positioned in front of the sheet material for applying a metal onto the sheet material and a means for fixing the metal to the sheet material at specified points, in accordance with the invention, the means for applying the metal onto the sheet material is made as a reservoir with a solution containing a salt of the metal and as a fixture for impregnating the sheet material with said solution, and the means for fixing the metal to the sheet material is made as a generator of laser radiation pulses and as a unit for focusing said pulses on specified points at a surface of the sheet material to extract the metal from the solution at said points.

With such a design of the device for applying a metallized image, it is possible to create an original image from metallized points in any combination thereof, and this creation allows production of personified images with high protective properties.

BRIEF DESCRIPTION OF DRAWINGS

The invention will be further explained by description of particular embodiments that not limit the present invention, wherein.

BEST MODES OF CARRYING OUT THE INVENTION

The inventive method for producing a metallized image on a sheet material is carried out as follows.

Figure 1:
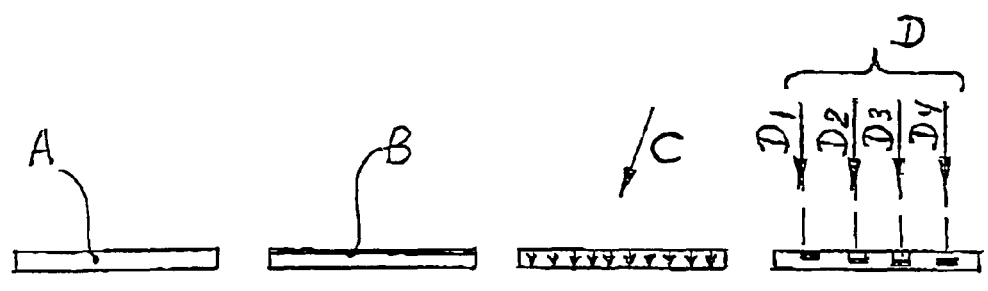
FIG. 1 illustrates an inventive method for producing a metallized image on a sheet material.
Figure 2:
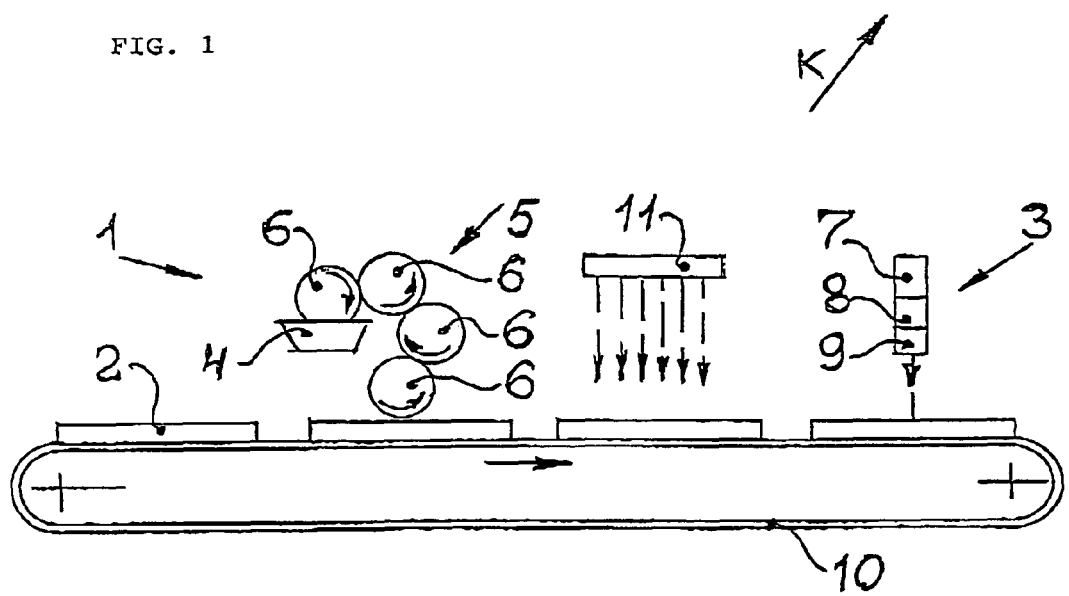
FIG. 2 illustrates a general view of a device for applying a metallized image.

A solution B containing a metal salt is applied to a sheet material A (FIG. 1). There are the step C of impregnating the sheet material A with this solution B and the step of directing focused pulses of a laser radiation D on specified points of said material A. When a focused pulse of the laser radiation D acts onto the sheet material A impregnated with the solution, an interaction of the laser radiation with the solution to form plasma takes place at specified points of said material within a laser spot. As a result of this interaction, a photochemical reaction occurs, which results in that a metal ion is reduced into the elementary state thereof by associating the required number of electrons, and a metallic film E is deposited in a zone of the laser spot, said film being firmly fixed to a filler of the sheet material. Depending upon a duration and an intensity of a radiation pulse and its focusing on a predetermined layer of the sheet material A, the results of interaction of the radiation with the material impregnated with the solution are as follows:

at a small power of the radiation D1, the metal film E is deposited closely to the material surface;

at a larger power of the radiation D2, a recess is formed at the sheet material surface, and the metal film E is deposited at a bottom of said recess;

at a yet larger power of the radiation D3, a size of a recess at the sheet material surface grows;

in focusing the radiation D4 on a point located within the thickness of the sheet material, the metal film will be deposited within the filler thereof.

If copper salts were present in the solution, then, a copper film will be deposited at the bottom of a recess. When illuminating K from the side of a smooth surface of the sheet material and with a sufficient size of the recess, a viewer from the side of entering the recess will see bright-yellow luminous points of the copper film. A combination of said points constituting a metallized image provides reliable protection of special products printed on the sheet material against counterfeit. The metal film deposited in the body of the sheet material by the radiation D4 will look like a black point when viewing against the light. The combination of said points constituting a metallized image will also provide protection of special products printed on the material against counterfeit.

The described method for producing a metallized image will not vary in case of impregnating the sheet material with a solution containing salts of several metals. In this case, protection of special products printed on the material against counterfeit will be better because not only a reproduction of metallized points but also their composition will be necessary.

The inventive device for applying a metallized image onto a sheet material comprises a means 1 for applying a solution with a metal salt onto the sheet material 2 and a means 3 for fixing the metal to the sheet material 2.

The means 1 for applying a solution with a metal salt onto the sheet material 2 comprises a reservoir 4 with the solution and a fixture 5 for impregnating the sheet material 2 with said solution, said fixture including a series of drive rollers 6 (not shown in FIG. 1) for transferring the solution from the reservoir onto the sheet material 2.

The means 3 for fixing the metal to the sheet material comprises a generator 7 of pulses of laser radiation, a unit 8 for controlling a power of the laser radiation pulses, and a unit 9 for focusing said pulses on specified points at a surface of the sheet material 2.

A driving conveyor 10 (not shown in the FIG. 1) moves the sheet material 2 over technological stations for processing thereof.

A device 11 for drying the surface of said material with warm air is arranged between the stations for impregnating the sheet material with the solution and for treating the impregnated material by a laser. The inventive device for applying a metallized image onto a sheet material operates as follows. When the sheet material 2 moves on the conveyor 10, the metal salt-containing solution is first applied thereon from the reservoir 4. Then, during further movement, the sheet material 2 is slightly dried by the device 11 and is subjected to laser radiation pulses of the generator 7. The unit 9 for focusing the laser radiation pulses provides, when the sheet material 2 moves, a sequential action of said pulses to specified points at the material surface, while the unit 8 controls a power variation for each of said pulses.

When the laser radiation pulse interacts with the solution at each specified point on the surface of the sheet material, the deposition of a metal film takes place at the bottom of the recess formed in said material by the laser radiation. To deposit the metal film at the bottom of each recess in the sheet material, it is sufficient to expose the solution to the laser radiation pulse having a duration of 10 ns. A combination of the thus produced metallized points constitutes a metallized image.

INDUSTRIAL APPLICABILITY

The inventive method for producing a metallized image on a sheet material and the inventive device for carrying out said method allow creation, on the sheet material, an image reliably protecting special products printed on said material against counterfeit.

The invention claimed is:

1. A method for producing a metalized image on a sheet material for protecting special products printed on a sheet material against counterfeit, the method comprising the steps of:
  (a) applying a solution containing a salt of a metal onto the sheet material and impregnating the sheet material with the solution;
  (b) exposing the sheet material at specified points to laser radiation pulses so as to deposit the metal from the solution at the specified points of the sheet material within its thickness, thereby metalizing the specified points of the sheet material with the deposited material to form a metalized image from a combination of metalized specified points.

2. The method according to claim 1, wherein the deposition of the metal from the solution is provided by focusing the laser electromagnetic radiation pulses on the specified points of a surface of the sheet material.

3. The method according to claim 1, wherein the laser radiation pulses reduce, in the solution, metal ions to the metal and deposit the metal at the specified points of the sheet material.

4. The method according to claim 1, limiting duration and energy of the laser radiation pulses to values at which the laser radiation is unable to burn the sheet material through.

5. The method according to claim 1, comprising forming channels in the sheet material under impact of the laser radiation pulses, and depositing the metal from the solution at the bottom of the channels to form the image from the combination of the metalized points imbedded into the body of the sheet material.

6. The method according to claim 1, comprising preparing a solution in which salts of several metals are present, and depositing simultaneously all the metals from the solution at each of the specified points of the sheet material, thereby forming either metal alloys or doped metals at the metalized specified points.

7. An apparatus for producing a metalized image on a sheet material for protecting special products printed on the sheet material against counterfeit, the apparatus comprising:
  (a) a device positioned in front of the sheet material for applying a solution containing a salt of a metal onto the sheet material and for impregnating the sheet material with the solution; and
  (b) a device for exposing the sheet material to laser radiation pulses at specified points;
  wherein the device (a) comprises a reservoir with the solution and a fixture for transferring the solution from the reservoir to the sheet material and impregnating the sheet material with the solution, and
  wherein the device (b) comprises a generator of the laser radiation pulses and a unit for focusing the laser radiation pulses on the specified points of the sheet material to deposit the metal at the specified points of the sheet material within its thickness from the solution impregnated into the sheet material.

* * * * *